(12) United States Patent
Lee et al.

(10) Patent No.: US 8,311,150 B2
(45) Date of Patent: Nov. 13, 2012

(54) METHOD FOR ACHIEVING TRANSMISSION DIVERSITY IN A MULTIPLE ANTENNA SYSTEM

(75) Inventors: Wook Bong Lee, Anyang-si (KR); Moon Il Lee, Anyang-si (KR); Bin Chul Imh, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 765 days.

(21) Appl. No.: 12/453,345

(22) Filed: May 7, 2009

(65) Prior Publication Data
US 2009/0279632 A1 Nov. 12, 2009

Related U.S. Application Data

(60) Provisional application No. 61/051,358, filed on May 8, 2008.

(30) Foreign Application Priority Data

Sep. 8, 2008 (KR) .................. 10-2008-0088256

(51) Int. Cl.
*H04L 27/00* (2006.01)

(52) U.S. Cl. ....................................................... 375/299
(58) Field of Classification Search .................. 375/295, 375/299, 267
See application file for complete search history.

(56) References Cited

U.S. PATENT DOCUMENTS

| | | | |
|---|---|---|---|
| 2007/0274411 A1 | 11/2007 | Lee et al. | |
| 2009/0028264 A1* | 1/2009 | Zhang et al. ................... | 375/267 |
| 2009/0245408 A1* | 10/2009 | Mujtaba et al. ................ | 375/267 |
| 2009/0323841 A1* | 12/2009 | Clerckx et al. ................ | 375/260 |
| 2010/0304691 A1* | 12/2010 | Goransson et al. ............. | 455/69 |

FOREIGN PATENT DOCUMENTS

| | | |
|---|---|---|
| KR | 10-2006-0024297 | 3/2006 |
| KR | 10-2006-0032765 | 4/2006 |
| KR | 10-2008-0007072 | 1/2008 |

* cited by examiner

*Primary Examiner* — Kevin M Burd
(74) *Attorney, Agent, or Firm* — McKenna Long & Aldridge LLP

(57) ABSTRACT

A method for achieving transmission diversity in a multiple antenna system is disclosed. The transmission diversity method includes selecting a column vector from a matrix DETERMINED according to a resource index and a current rank, and multiplying the selected column vector by a transmission symbol.

15 Claims, 4 Drawing Sheets

PRUs for forming DRUs

METHOD FOR ACHIEVING TRANSMISSION DIVERSITY IN A MULTIPLE ANTENNA SYSTEM

CROSS-REFERENCE TO RELATED APPLICATIONS

This application claims the benefit of Korean Patent Application No. 10-2008-0088256, filed on Sep. 8, 2008, which is hereby incorporated by reference as if fully set forth herein.

This application also claims the benefit of U.S. Provisional Application Ser. Nos. 61/051,358, filed on May 8, 2008, which is hereby incorporated by reference as if fully set forth herein.

BACKGROUND OF THE INVENTION

1. Field of the Invention

The present invention relates to a multiple-antenna orthogonal frequency division multiplexing (OFDM) system, and more particularly, to a method for increasing diversity gain by applying cyclic delay diversity (CDD) in addition to codeword cycling diversity.

2. Discussion of the Related Art

A multiple-antenna OFDM system requires a variety of techniques to increase the transmission reliability of data. Among them, space-time code (STC), codeword cycling diversity, and CDD aim to increase spatial diversity gain, and beamforming (BF) and precoding are designed to increase signal-to-noise ratio (SNR). STC, code cycling diversity and CDD are used mainly to increase transmission reliability in an open-loop system where feedback information is not available to a transmitter, whereas BF and preceding are used to maximize SNR through feedback information in a closed-loop system where feedback information is available to a transmitter.

CDD uses different delays $\tau 0, \ldots, \tau Nt-1$ for different antennas, as illustrated in FIG. 1.

Each antenna applies its specific different delay to a time-domain transmission signal, prior to transmission. If signals to be transmitted through the antennas are the same before they are delayed, the multi-path is increased so that the frequency selectivity of a channel is increased. Space frequency block code (SFBC) is one of rank1-transmission schemes among multiple-antenna transmission techniques. SFBC was proposed to use an Alamouti's space time block code (STBC) to the frequency domain.

The codeword cycling scheme applies different preceding vectors or matrices to different time or frequency resources so that a transmission signal experience a plurality of equivalent channels, thereby achieving a diversity gain.

Typically, a diversity scheme needs as many channel estimation pilots as the number of antennas. As a result, pilot overhead increases.

SUMMARY OF THE INVENTION

The present invention provides a method for increasing diversity gain, when CDD is used in a multiple-antenna OFDM system. The diversity increasing method is applicable to a base station and a mobile station in a system like Institute of Electrical and Electronics Engineers (IEEE) 802.16m.

An object of the present invention devised to solve the problem lies on a transmission diversity method for using an appropriate codeword cycling according to a rank, increasing diversity gain without impairing support of a high rank, reducing pilot overhead, and achieving additional transmission diversity by using CDD additionally.

The object of the present invention can be achieved by providing a transmission diversity method in a multiple antenna system, including selecting a column vector from a matrix determined according to a resource index and a current rank, and multiplying the selected column vector by a transmission symbol.

If the current rank is one of 1 and 2, the selecting the column vector may include selecting two column vectors from the matrix.

If the current rank is 3, the selecting the column vector may include selecting three column vectors from the matrix, and if the current rank is 4, the selecting the column vector may include selecting four column vectors from the matrix.

The transmission symbol may be one of a space time block code-modulated symbol and a space frequency block code-modulated symbol, if the current rank is 1.

The transmission symbol may be a spatially multiplexed independent symbol, if the current rank is 2 or larger.

The matrix may change according to a resource index.

The matrix may change according to a structure of non-successively allocated physical resource units.

In another aspect of the present invention, provided herein is a transmission diversity method in an open-loop multiple-input multiple-output (MIMO) system, including generating a data stream using one of a space time block code or a space frequency block code if a current rank is 1, and generating a data stream by spatial multiplexing if the current rank is 2 or larger, selecting a column vector from a matrix determined by a resource index according to the current rank, multiplying the selected column vector by the data stream. The transmission diversity method further includes multiplying the data stream multiplied by the column vector by a CDD diagonal matrix.

The selecting the column vector may include selecting two column vectors from the matrix, if the current rank is one of 1 and 2.

The selecting the column vector may include selecting three column vectors from the matrix, if the current rank is 3 and selecting four column vectors from the matrix, if the current rank is 4.

The matrix may change according to a resource index.

The matrix may change according to a structure of non-successively allocated physical resource units.

The transmission diversity method may further include transmitting pilots selectively according to the current rank.

The transmission diversity method may further include transmitting pilots allocated to distributed resource units only in two data streams.

The transmission diversity method may further include selecting one of transmitting pilots in two data streams and transmitting pilots in four data streams.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings.

Let a CDD diagonal matrix be denoted by D and a transmission symbol vector be denoted by x. Then, D and x are expressed as Equation 1 and Equation 2, respectively.

$$D = \begin{bmatrix} e^{j\theta_0 k} & 0 & \cdots & 0 \\ 0 & e^{j\theta_1 k} & \cdots & 0 \\ \cdots & \cdots & \ddots & \cdots \\ 0 & 0 & \cdots & e^{j\theta_{(N_t-1)}k} \end{bmatrix}$$ [Equation 1]

where D is a $N_t \times N_t$ matrix, $\theta_i$ denotes a phase shift value of an $i^{th}$ transmit antenna, $N_t$ denotes the number of transmit antennas, and k denotes a subcarrier index, a resource index, or a subcarrier group index.

Figure 1:
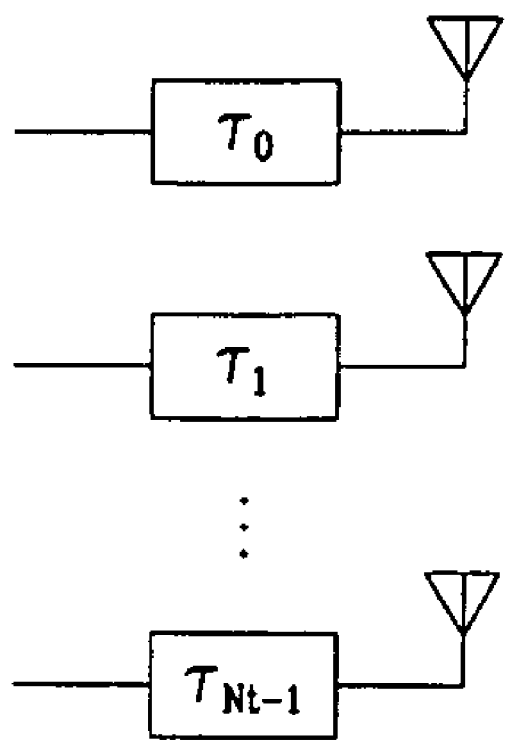
FIG. 1 illustrates blocks for applying different delays to different antennas in CDD.

If every θ is zero, D is an identity matrix and it may not be multiplied by the transmission symbol vector x. If at least one of $\theta_i$ values is non-zero, the matrix D may bring an additional transmission diversity. Also, for a delay value τ and a fast Fourier transform (FFT) size $N_{fft}$, if $\theta = -2\pi/N_{fft}\tau$ and k is a subcarrier index, the matrix D can be processed in the time domain as illustrated in FIG. 1.

Here, D is a CDD matrix. To reduce pilot overhead for channel estimation, τ can be set to a small value, for example, between 0 and 4.

$$x = \begin{bmatrix} x_1 \\ \cdots \\ x_R \end{bmatrix}$$ [Equation 2]

where R denotes the number of streams transmitted at one time.

If x is a STBC or a SFBC, it can be represented as $$x = \begin{bmatrix} x_1 & -x_2^* \\ x_2 & x_1^* \end{bmatrix}$$ [Equation 3]

where the rows represent stream indexes and the columns represent time resource indexes (in case of an STBC) or frequency resource indexes (in case of an SFBC).

If spatial multiplexing is adopted, x is given as $$x = \begin{bmatrix} x_1 \\ x_2 \\ \cdots \\ x_M \end{bmatrix}$$ [Equation 4]

where M denotes a multiplexing rate. When spatial multiplexing is employed, M is equal to R.

A transmission symbol vector y is expressed as $$y = DUx$$ [Equation 5]

where U denotes an $N_t \times R$ matrix that can be changed depending on a subband.

Figure 2:
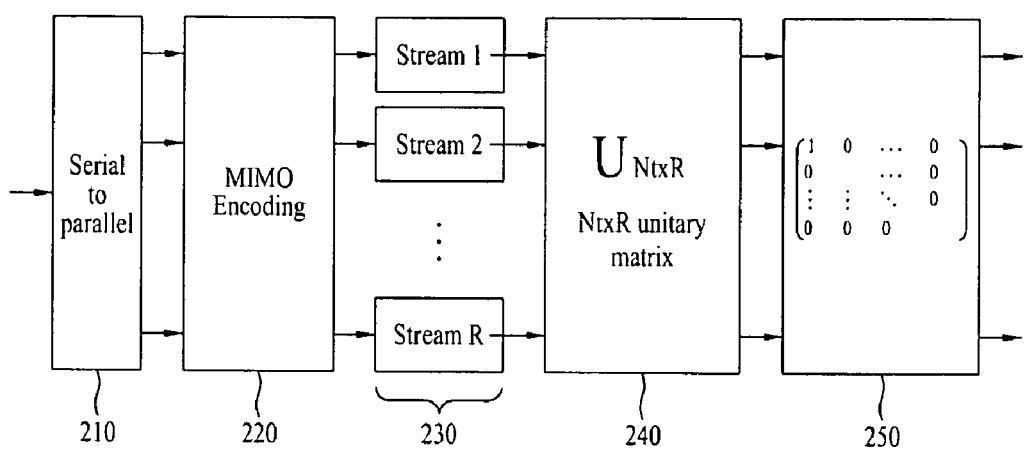
FIG. 2 is a block diagram illustrating the configuration of a transmitter to which an exemplary embodiment of the present invention is applied.

FIG. 2 is a block diagram illustrating the configuration of a transmitter to which an exemplary embodiment of the present invention is applied.

Referring to FIG. 2, a MIMO encoder 220 converts data received from a serial-to-parallel converter 210 to data streams 230. If a current rank is 1, the MIMO encoder 220 generates the data streams 230 using one of an STBC or an SFBC. If the current rank is 2 or higher, the MIMO encoder 220 generates the data streams 230 by spatial multiplexing.

A matrix block 240 receives the data streams 230 from the MIMO encoder 220 and applies a different matrix to the data streams 230 according to the number of antennas and a multiplexing rate. Then a diagonal matrix block 250 can be used additionally.

Let final transmission symbols be denoted by DUx If the rank is 1 or 2, the matrix U is $$U = [v_1 \, v_2]$$ [Equation 6]

If the rank is 3, the matrix U is $$U = [v_1 \, v_2 \, v_3]$$ [Equation 7]

If the rank is 4, the matrix U is $$U = [v_1 \, v_2 \, v_3 \, v_4]$$ [Equation 8]

That is, $v_1$ and $v_2$ are selected for a rank of 1 or 2, $v_1$, $v_2$ and $v_3$ are selected for a rank of 3, and $v_1$, $v_2$, $v_3$ and $v_4$ are selected for a rank of 4. The selected matrix is multiplied by x.

$v_n$ denotes an $n^{th}$ column vector of the matrix U and the dimension of the column vector $v_n$ is $N_t \times 1$ Equation 6, Equation 7 and Equation 8 describe subsets of a matrix that is determined according to a resource index.

Figure 3:
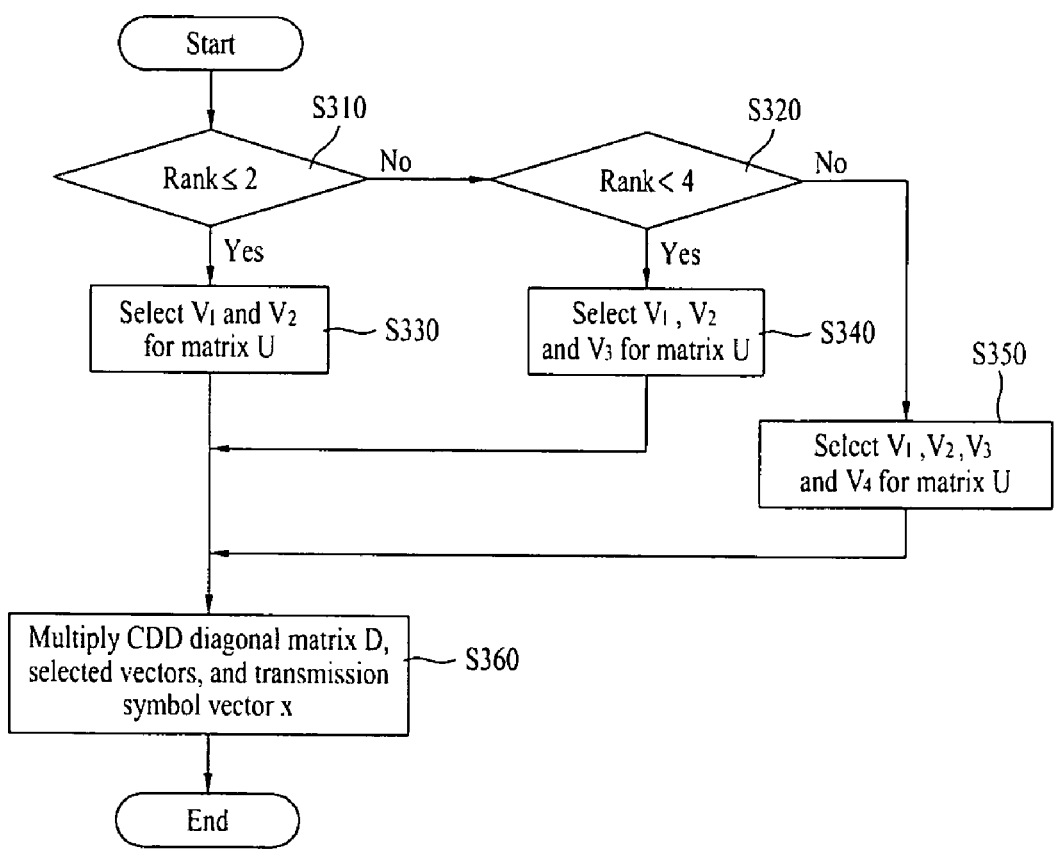
FIG. 3 is a flowchart illustrating a transmission diversity method according to an exemplary embodiment of the present invention.

FIG. 3 is a flowchart illustrating a transmission diversity method according to an exemplary embodiment of the present invention.

Referring to FIG. 3, column vectors are selected for the matrix U according to a current rank and a resource index in steps S310 to S350.

More specifically, if the current rank is less than or equal to 2, the matrix U is generated by selecting two column vectors from a matrix determined according to the resource index in steps S310 and S330. If the current rank is 3, the matrix U is generated by selecting three column vectors from the matrix determined according to the resource index in steps S320 and S340. If the current rank is 4, the matrix U is generated by selecting four column vectors from the matrix determined according to the resource index in steps S320 and S350.

In step S360, DUx is computed by multiplying the CDD diagonal matrix D, the selected column vectors, and the transmission symbol vector x. If every θ is zero in the matrix D, the procedure may end without multiplying the matrix D.

Figure 4:
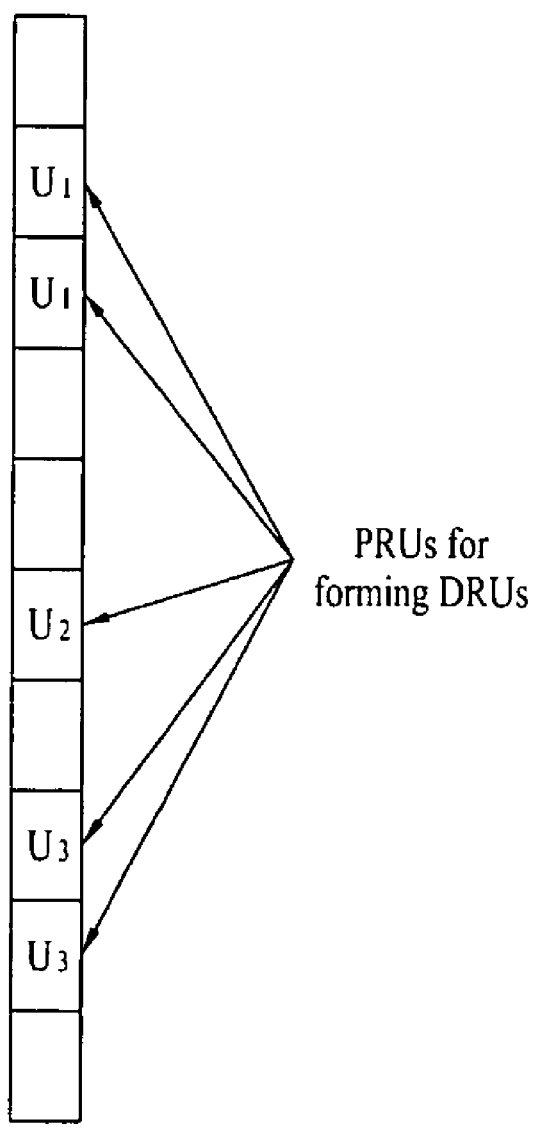
FIG. 4 illustrates the structure of non-successively allocated physical resource units (PRUs) to which an exemplary embodiment of the present invention is applied.

As described above, the matrix U can be changed depending on a subband or any other factor. In this case, different equivalent channels are created in different subbands, thus achieving a higher diversity gain. A predetermined number of RUs can be allocated to each of the subbands. Or the matrix U can be changed according to the structure of non-successively allocated PRUs, as illustrated in FIG. 4. FIG. 4 illustrates the change of the matrix U from $U_1$ to $U_2$ and then $U_3$ each time an RU is followed by a non-successive RU. The change of the matrix U in the manner illustrated in FIG. 4 enables better channel estimation than the change of the matrix U for successive PRUs.

Meanwhile, U should be known to both a transmitter and a receiver. The transmitter and the receiver each need a memory for storing U. Alternatively, an additional memory is not necessary, when U is selected from part of a closed loop-MIMO (CL-MIMO) codebook.

Transmission pilots are one of factors that cause a large overhead. The transmission pilots can be reduced in number effectively as follows.

When specific resources are allocated to a mobile station, all pilots can be set as dedicated to the mobile station. Then, the overhead of the pilots can be reduced by multiplying the same DU matrix to the pilots. For example, if a transmission rank is 1 or 2, U is a $N_t \times 2$ matrix, as described before. A pilot is multiplied by DU and transmitted at a predetermined position in each stream. In other words, $Dv_1p_1$ (where $p_1$ is a first pilot signal) is transmitted at a pilot position in a first stream and $Dv_1p_2$ (where $p_2$ is a second pilot signal) is transmitted at a pilot position in a second stream. The receiver performs channel estimation using the matrix-multiplied pilots $Dv_1p_1$ and $Dv_1p_2$ and decodes a received signal based on the channel estimation. In the same manner, U is a $N_t \times 3$ matrix for a rank of 3. $Dv_1p_1$ is transmitted at a pilot position in a first stream, $Dv_1p_2$ is transmitted at a pilot position in a second stream, and $Dv_1p_3$ is transmitted at a pilot position in a third stream. Pilots can be transmitted in the same manner in other cases.

When signals are transmitted to a plurality of mobile stations, transmission pilots especially in distributed RUs are meant for all of the mobile stations. In this case, pilot overhead can be reduced in the following methods.

One of the pilot overhead reduction methods is to transmit pilots only in two streams. That is, $Dv_1p_1$ is transmitted at a pilot position in a first stream and $Dv_1p_2$ is transmitted at a pilot position in a second stream. A receiver with a transmission rank of 1 or 2 decodes a signal using the pilots of the two streams.

Higher-rank (rank 3 and rank 4) channel estimation can be performed using predefined matrices D and U.

Another pilot overhead reduction method is to select pilot transmission in two streams or pilot transmission in four streams. A base station can notify the mobile stations of a selected pilot pattern. This method is possible because a high rank is not selected in most cases.

Exemplary embodiments of the present invention advantageously increase diversity gain, facilitate channel estimation, and reduce the number of pilot for channel estimation by applying CDD in addition to codeword cycling diversity.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A transmission diversity method in an open-loop multiple-input multiple-output (MIMO) system, comprising:
generating, by a transmitter, two data streams using one of a space time block code and a space frequency block code if a current rank is 1 and generating the same number of data streams as the current rank by spatial multiplexing if the current rank is 2 or larger; and
multiplying two column vectors from a matrix by the two data streams if the current rank is 1 and multiplying the same number of column vectors from the matrix as the current rank by the same number of data streams as the current rank if the current rank is 2 or larger.

2. The transmission diversity method according to claim 1, wherein the matrix is selected from a subset of a codebook defined for a closed loop MIMO.

3. The transmission diversity method according to claim 1, wherein the two column vectors are the first two column vectors from the matrix if the current rank is one of 1 and 2.

4. The transmission diversity method according to claim 1, wherein the multiplying the same number of column vectors as the current rank by the same number of data streams as the current rank includes multiplying the first three column vectors from the matrix by three data streams if the current rank is 3 and the first four column vectors from the matrix by four data streams if the current rank is 4.

5. The transmission diversity method according to claim 1, wherein the matrix changes according to non-successively allocated physical resource units.

6. The transmission diversity method according to claim 1, further comprising:
transmitting, to a receiver, two pilot streams, to which the two column vectors from the matrix are applied, if the current rank is 1 or 2.

7. The transmission diversity method according to claim 1, further comprising:
transmitting, to a receiver, only two pilot streams in distributed resource units.

8. The transmission diversity method according to claim 1, further comprising:
transmitting, to a receiver, two pilot streams or transmitting four pilot streams.

9. The transmission diversity method according to claim 1, wherein the matrix is a unitary matrix, and each column vector from the matrix has a dimension of $N_t$-by-1, where $N_t$ is a number of transmit antennas.

10. The transmission diversity method according to claim 1, wherein the matrix is determined by a resource index according to the current rank.

11. A transmitter configured to perform transmitter diversity in an open-loop multiple-input multiple-output (MIMO) system, the transmitter comprising:
a MIMO encoding block for generating two data streams using one of a space time block code and a space frequency block code if a current rank is 1 and for generating the same number of data streams as the current rank by spatial multiplexing if the current rank is 2 or larger; and a matrix block for multiplying two column vectors from a matrix by the two data streams if the current rank is 1 and for multiplying the same number of column vectors from the matrix as the current rank by the same number of data streams as the current rank if the current rank is 2 or larger.

12. The transmitter according to claim 11, wherein the matrix in the matrix block is selected from a subset of a codebook defined for a closed loop MIMO.

13. The transmitter according to claim 11, wherein the two column vector are the first two column vectors from the matrix if the current rank is one of 1 and 2, and wherein the matrix block multiplies the first three column vectors from the matrix by three data streams if the current rank is 3 and multiplies the first four column vectors from the matrix by four data streams if the current rank is 4.

14. The transmitter according to claim 11, wherein the matrix is a unitary matrix, and each column vector from the matrix has a dimension of $N_t$-by-1, where $N_t$ is a number of transmit antennas.

15. The transmitter according to claim 11, wherein the matrix is determined by a resource index according to the current rank.

* * * * *